United States Patent [19]

Pimm et al.

[11] Patent Number: 4,974,153
[45] Date of Patent: Nov. 27, 1990

[54] REPEATER INTERLOCK SCHEME FOR TRANSACTIONS BETWEEN TWO BUSES INCLUDING TRANSACTION AND INTERLOCK BUFFERS

[75] Inventors: David W. Pimm, Nashua, N.H.; Paul J. Natusch, Westford; Robert T. Silver, Marlboro, both of Mass.

[73] Assignee: Digital Equipment Corporation, Maynard, Mass.

[21] Appl. No.: 162,620

[22] Filed: Mar. 1, 1988

Related U.S. Application Data

[63] Continuation-in-part of Ser. No. 93,501, Sep. 4, 1987, Pat. No. 4,897,786.

[51] Int. Cl.$^5$ .................... G06F 13/36; G06F 13/40
[52] U.S. Cl. .................... 364/200; 340/825.5; 364/240.2; 364/239
[58] Field of Search ... 364/200 MS File, 900 MS File; 340/825.5

[56] References Cited

U.S. PATENT DOCUMENTS

4,484,267  11/1984  Fletcher ........................ 364/200
4,604,689  8/1986  Burger ........................... 364/200

Primary Examiner—Lawrence E. Anderson
Attorney, Agent, or Firm—Kenyon & Kenyon

[57] ABSTRACT

A system for implementing a repeater interlock scheme between a first and a second bus utilizes two repeaters. The first repeater coupled to the first bus includes an interlock state bit which is set upon the acceptance of an interlock transaction from a processor. No further interlock transactions will be accepted while the interlock state bit is set. The interlock transaction is passed to a transaction buffer in the second repeater which is coupled to memory through the second bus. The transaction buffer passes the interlock data for memory to the second bus while simultaneously loading a one deep interlock buffer. A confirmation is sent from the memory back to the transaction buffer. If the confirmation is interlock busy, then the interlock transaction is retried from the interlock buffer thus allowing the transaction buffer to process other commands. The interlock buffer waits for an unlock write signal before retrying an interlock transaction thus alleviating congestion on the second bus.

6 Claims, 11 Drawing Sheets

*TABLE FIG. 9d*

| CONFIRMATION | | |
|---|---|---|
| 0 0 | NO ACK | |
| 0 1 | ACCEPT DATA | |
| 1 0 | INTERLOCK BUSY | |
| 1 1 | BUSY | |

FIG. 10

REPEATER INTERLOCK SCHEME FOR TRANSACTIONS BETWEEN TWO BUSES INCLUDING TRANSACTION AND INTERLOCK BUFFERS

This is a continuation-in-part of application Ser. No. 093,501, filed Sept. 4, 1987, now U.S. Pat. No. 4,897,786.

BACKGROUND OF THE INVENTION

This invention relates to a multiprocessor system in general and, more particularly to an interlock scheme in which intelligent buffer repeaters are used to connect busses together.

The use of a single bus in a multiprocessor system presents several difficulties. In order to accommodate several nodes on a bus, the electrical loading of the bus is significantly increased. This slows down the cycle time of the system.

One solution to the above problems is the use of two separate busses interconnected through a repeater. This serves to virtually extend the bus to accommodate several nodes while not actually increasing the electrical loading on the bus.

However, a difficulty arises with interlock transactions which must be passed through the repeater. When a device on the first bus generates an interlock read command to access memory, it must be sent through the repeater. If accepted by the memory, the interlock read command will lock the memory until an unlock write signal is generated. If the memory is already locked, then the interlock read command is stored in a buffer until an unlock write signal from the device unlocks the memory. Deadlock situations present themselves where the memory is locked, an interlock read is waiting in the buffer and an unlock write signal is behind the interlock read in the same buffer.

SUMMARY OF THE INVENTION

The present invention overcomes the problems of an interlock scheme through the use of control logic interaction between an interlock state bit and interlock buffer residing in the repeater hardware.

The present invention minimizes unnecessary interlock traffic while still giving all devices the ability to efficiently execute interlock instructions.

Multiprocessor systems may use two busses as a system interconnect for several processors, a memory controller, and several input/output adapters. The two busses are linked together through the use of a repeater. The first bus repeater shares its first bus with the several devices. It passes transactions through the repeater to the attached second repeater module. It also accepts all traffic coming from the second repeater module and passes it out to the first bus. The second repeater shares the second bus with a single memory controller and several other nexus. It takes in all traffic coming from the first repeater module and puts it out onto the second bus.

In order to keep interlock transactions from being lost, an interlock state bit is used in the first repeater module. This bit determines whether or not interlock transactions will be accepted by the first repeater and passed to the second repeater's transaction buffer. The interlock state bit is set when an interlock read transaction is accepted and reset when an unlock write is accepted by the first repeater When the bit is set, another interlock read will not be accepted by the first repeater. The device that generated the interlock will receive an interlock busy confirmation. The device then waits for an unlock write on the first bus before retrying the interlock busy transaction.

The second repeater incorporates a one deep interlock buffer for interlock read transactions. This interlock buffer is loaded each time an interlock read is placed on the second bus from the transaction buffer. The possible confirmations that the transaction buffer can receive are acknowledged (ack) i.e. transaction has been accepted, no acknowledgment (noack) i.e. no response to the transaction, busy, i.e. the transaction cannot be accepted at this time or interlock busy i.e. the memory is already locked. The interlock buffer is not used if a confirmation of ack, busy, or noack is received from the second bus. Busy or noack confirmations are handled by the transaction buffer control and immediately retried. The interlock buffer is "pending" if a confirmation of interlock busy is received. The control logic then waits for an unlock write on the second bus before retrying the "pending" interlock transaction. Confirmation is checked again and the transaction is retried, from the interlock buffer, if busy or noack is received. Another interlock busy confirmation will cause the interlock buffer logic to wait for another unlock write on the second bus. An ack confirmation will clear all interlock buffer status. A time out counter is implemented to stop infinite retries.

While the interlock transaction is waiting in the interlock buffer, other transactions from the first bus are being placed on the second bus from the transaction buffer. A higher utilization of the buffers in both busses is realized.

Further, devices that have received an interlock busy confirmation wait for an unlock write on the first bus before retrying the interlock read transaction. An interlock write command from another device on the first bus will reset the interlock state bit in the first repeater and cause all other devices to place their pending interlock transactions on the bus. An unlock write command from a device on the second bus would be placed on the first bus to invalidate cache. It would not reset the first repeater's interlock state bit, however it would cause all processors to retry their pending interlock transactions. Because this happens infrequently, this retrying would be tolerable. In contemplated embodiments, in order to avoid the useless bus traffic that would result from the devices on the first bus attempting to send their interlock transactions while the interlock state bit is still set, all unlock write commands from devices on the second bus are changed to write commands before they are placed on the first bus to invalidate each processors cache.

Accordingly, the present interlock scheme overcomes the problems encountered in multiprocessor interlock designs. The present invention minimizes unnecessary interlock traffic while still giving all of the devices the ability to efficiently execute interlock transactions.

DESCRIPTION OF THE INVENTION

Figure 1:
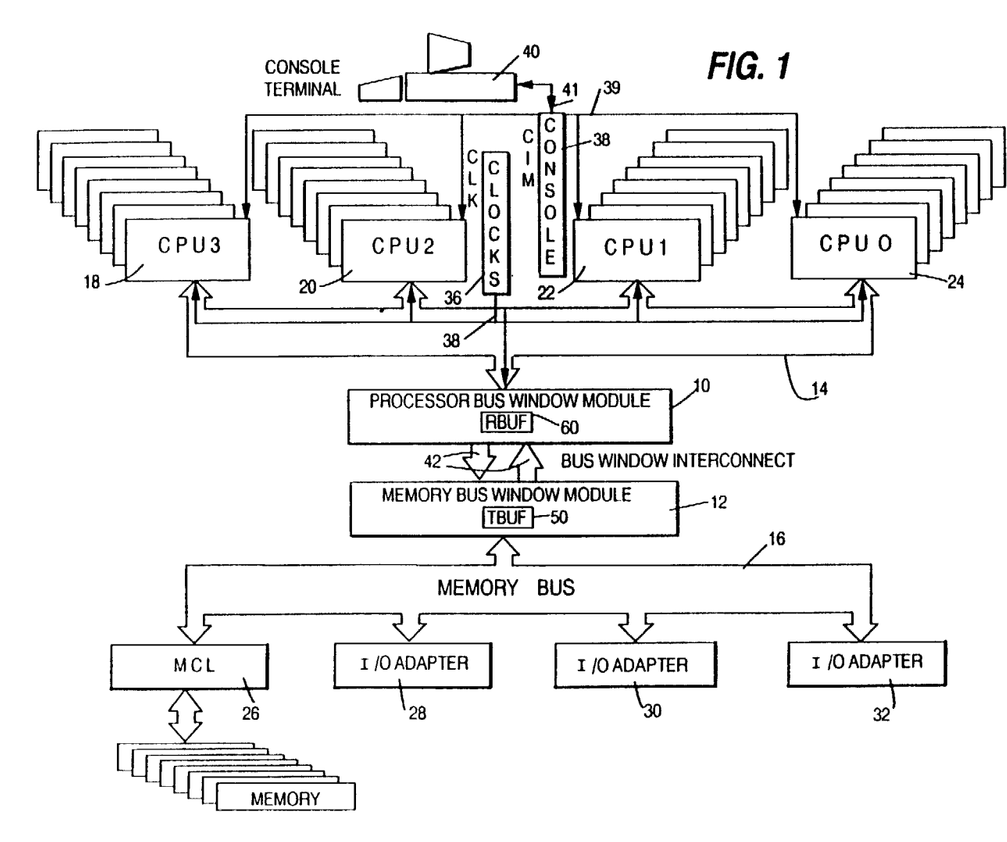
FIG. 1 is a block diagram of a multiprocessor system using the present invention.

Referring to FIG. 1, there is shown a block diagram of a multiprocessor system which utilizes the interlock scheme of the present invention. The system uses two busses, a first bus 14 and a second bus 16 as a system interconnect for four devices on the first bus (18, 20, 22, 24) one memory controller 26 and three devices on the second bus (28, 30, 32). The memory controller 26 accesses a memory 34. The two busses are linked together using a first repeater 10 and a second repeater 12. These repeaters can be bus window modules, for example. The first repeater 10 is coupled to the first bus and further interconnected by cables 42 to the second repeater 12. The second repeater 12 is coupled to the second bus 16.

A clock module 36 is coupled to all the devices through the processor bus 14 as indicated by line 37, as well as to the I/O devices in memory and both first and second repeaters. Further, a console interface module 38 is linked with the processors by line 39 and with the console terminal by line 41.

Both the first bus 14 and the second bus 16 consist of a specific group of signal connections which allow as many as five intelligent nodes to pass commands and data between each other. In a pended fashion the quad-processing system of FIG. 1 uses the repeater modules (10 and 12) to virtually extend each bus to accommodate eight nodes while not actually increasing the electrical loading on the bus. This system maintains the cycle time while allowing the extension of the bus, thus accommodating the several processors, memory and I/O of a multiprocessor system.

REPEATER

The link between the first bus 14 and the second bus 16 actually consists of two repeaters (10 and 12) and a set of interconnecting cables 42. Each of the two repeaters is physically identical although each plays a slightly different role in providing a path between the two busses.

The first repeater shares its bus with the four devices (18, 20, 22, 24). It watches this bus for commands and write data and passes those transactions through the first repeater to the second repeater 12. It also accepts all traffic coming from the second repeater 12 and passes it out to the first bus 14.

The second repeater 12 shares the second bus 16 with the single memory controller 26 (MCL) and from one to three nexus (28, 30, 32). It accepts all return read data requests by any of the devices on the first bus and also passes through write commands generated by devices on the second bus for the purpose of cache invalidation. It takes in all traffic coming from the first repeater 10 and puts it out onto the second bus 16.

The multiprocessor system implements transactions which use just the second bus, transactions which use just the first bus, and transactions which use both buses. The general transaction categories are outlined below.

Referring to FIG. 1, reads and writes to memory can be sourced by a device on the first bus 14. This transaction is accepted by the first repeater 10 and passed over cables 42 to the second repeater 12. The second repeater 12 places this command in a transaction buffer (TBUF) 50 and arbs for the second bus 16. Upon winning arbitration for the bus, the transaction is placed on the second bus 16 where it will be acknowledged by a memory controller (MCL) 26. If the transaction was a read transaction, read return and read continuation data will be placed on the second bus 16 by the memory or I/O devices. The second repeater 12 always accepts read return data destined for a device on the first bus. This data will be passed over the cables 42 to the first repeater 10 where it will be latched in a read return buffer 60. The first repeater 10 will now arb for the first bus 14 and upon winning the bus, will drive the read return data onto the bus where it can be latched by the appropriate device.

Reads and writes which originate in the first bus to the other devices on the second bus proceed much the same as reads and writes to memory except that, instead of the MCL 26, a device (28, 30, 32) will be communicating with the second repeater 12 on the second bus 16.

Reads to memory occur on the second bus 16 with read commands being passed from a device (28, 30, 32) to the MCL 26 and read return data being passed back from the MCL 26 to the device adapter as can be seen in FIG. 1. These commands and read return cycles would cause unnecessary traffic on the first bus 14. For this reason, they are restricted to the second bus 16 only and are not transmitted by the second repeater 12.

Writes to memory also occur on the second bus 16, with a device sourcing a write command and write data to the MCL 26. Unlike reads, though, the write command/address cycle must be accepted by the second repeater 12 and transmitted to the first repeater 10 to be placed on the first bus 14. This is because write addresses must be seen by the devices on the first bus (18, 20, 22, 24) in order for them to invalidate data which may reside in their caches. The data cycles accompanying such writes are not transmitted between busses since the caches only require write addresses in order to invalidate their data.

Figure 2:
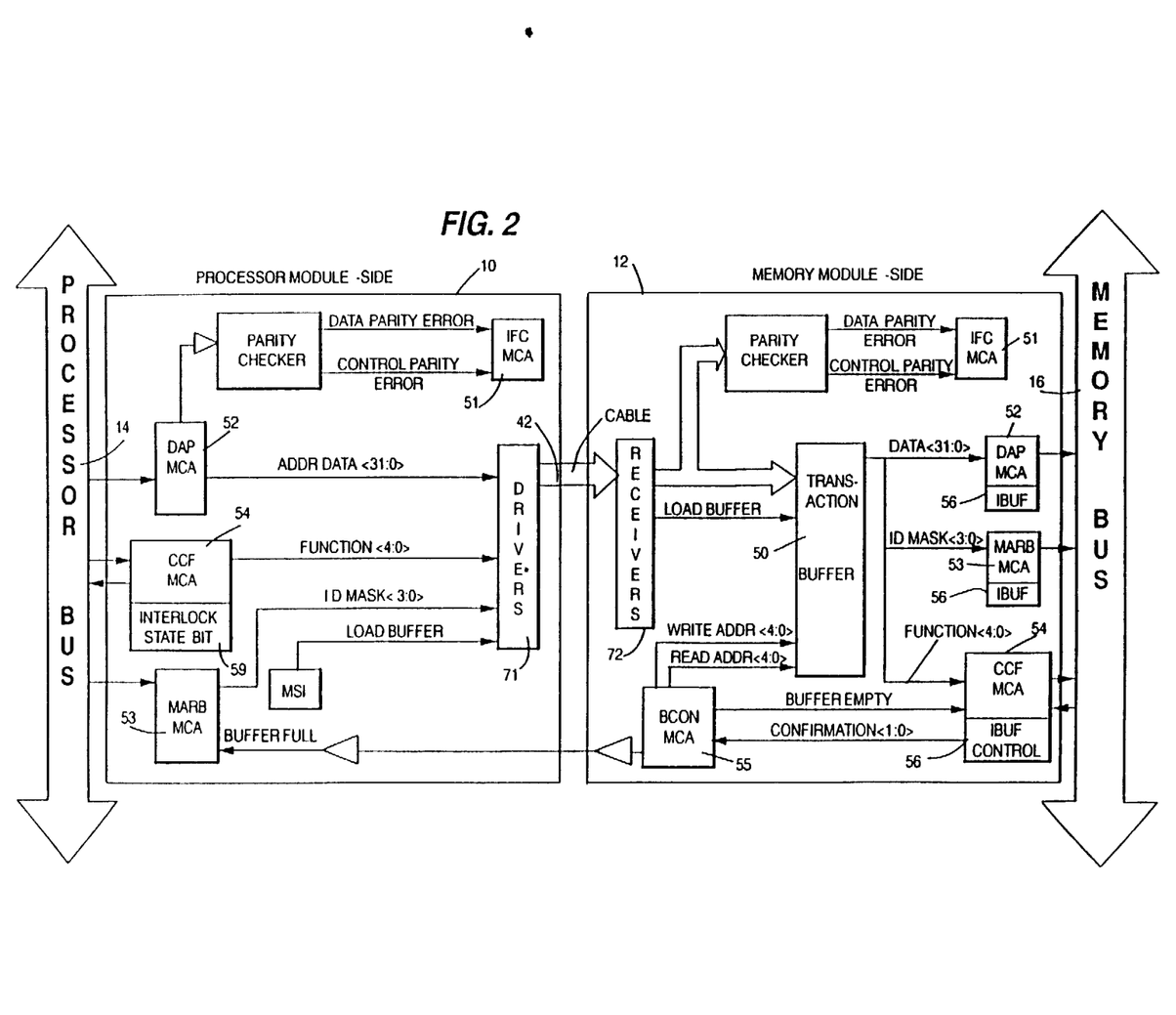
FIG. 2 is a block diagram of a CPU to Memory transaction.
Figure 3:
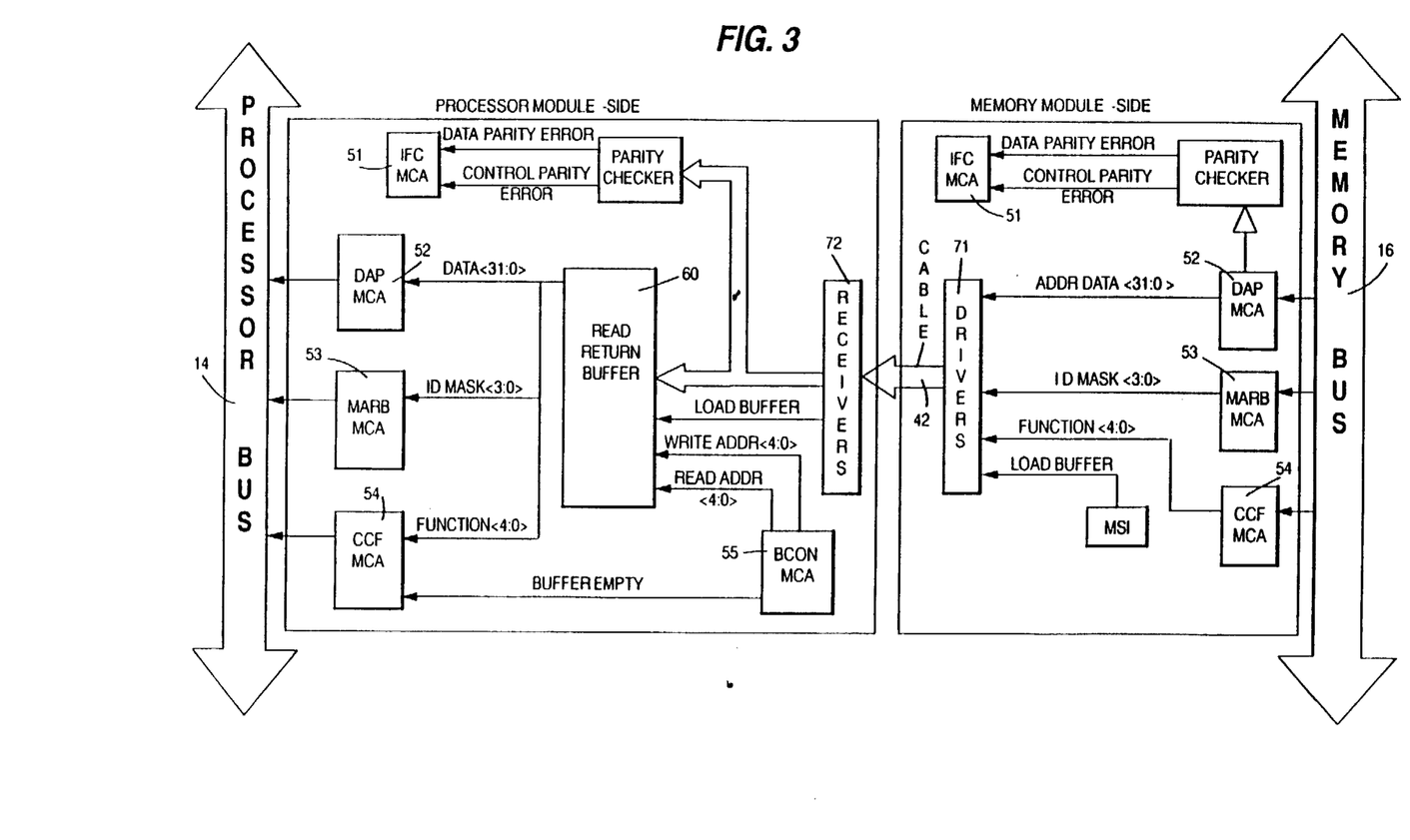
FIG. 3 is a block diagram of a Memory to CPU transaction.
Figure 4:
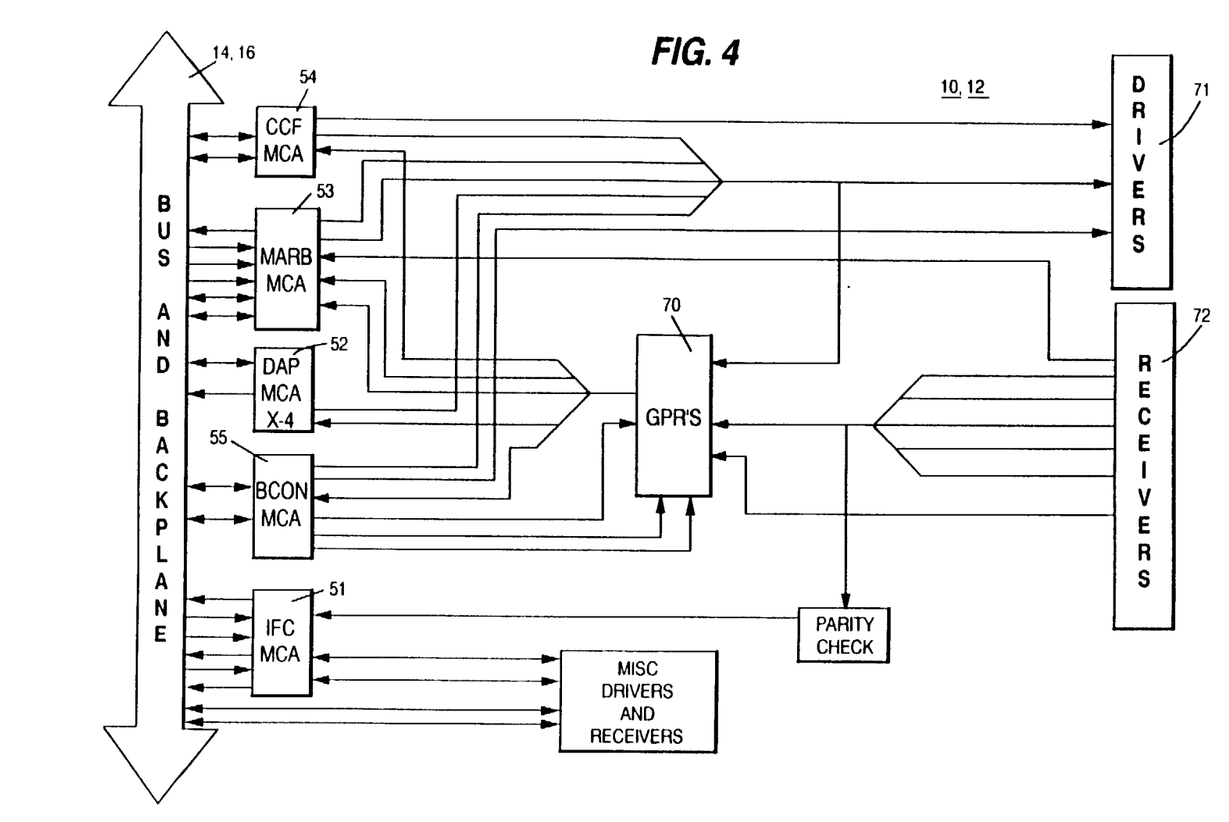
FIG. 4 is a block diagram of a bus window module.
Figure 5:
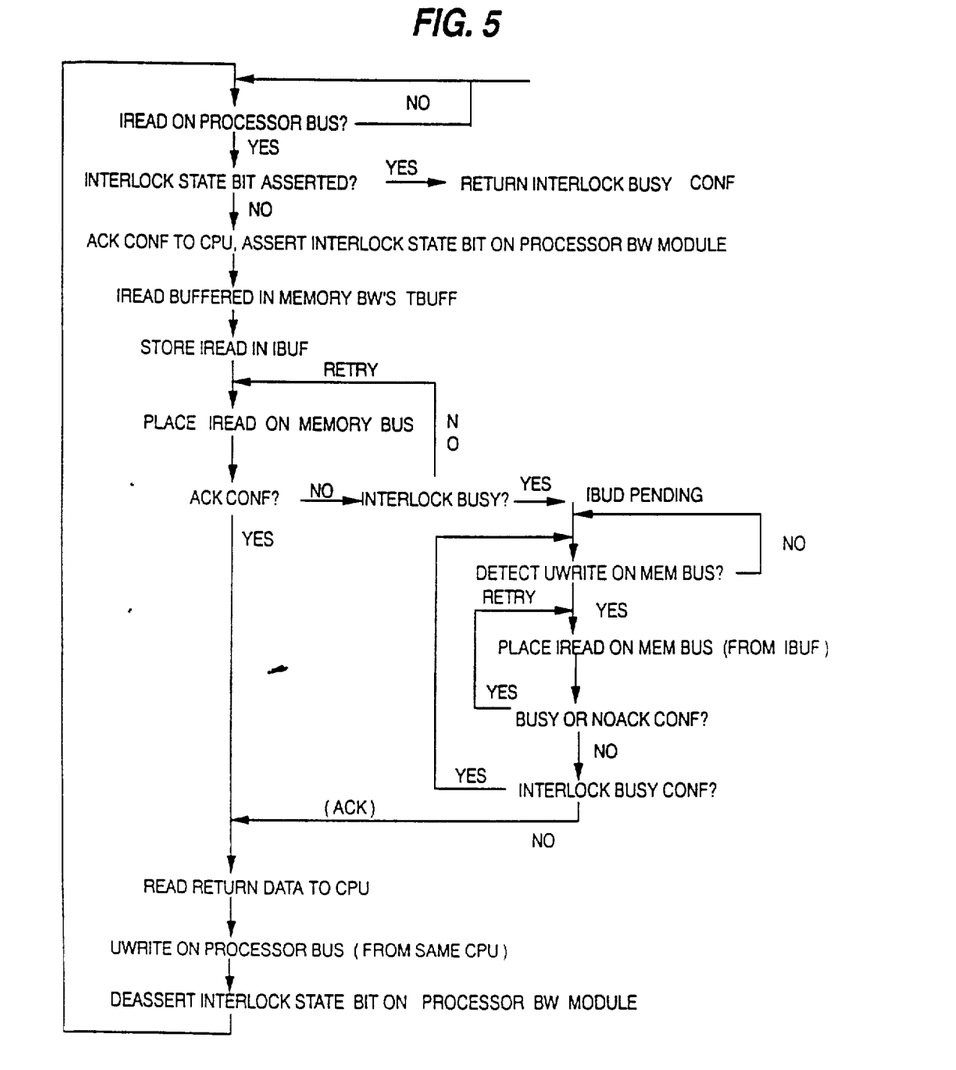
FIG. 5 is a flow diagram for an interlock transaction.

There are 5 different macro cell array (MCA) designs on a bus window module as shown in FIGS. 2, 3 and 4. They are the master arbitration (MARB) 53, control, confirmation, and function (CCF) 54, Buffer Control (BCON) 55, Interrupt and Fault Controller (IFC) 51 and Data Address Path (DAP) 52. The DAP 52 is byte sliced thus there are 4 DAP MCAs for a total of 8 MCAs on each bus window module.

The master arbitration MCA's 53 primary function is to control the arbitration among the bus nodes. It is the bus master on each bus controlling the MCL 26, I/O adapter (28, 30, 32) and second repeater 12 on the second bus 16 while controlling the four CPUs (18, 20, 22, 24) and the first repeater 10 on the first bus 14. It inputs the arb and hold lines from each node, along with memory busy, and determines who will use the bus by asserting bus enable for that node. This determining of who will use the bus, along with more complete definitions of the arb and hold lines and memory busy, are described in copending U.S. application Ser. No. 823,775, filed Jan. 29, 1986 for an APPARATUS AND METHOD OF RESPONDING TO AN ABORTED SIGNAL EXCHANGE BETWEEN SUBSYSTEMS IN A DATA PROCESSING SYSTEM and herein incorporated by reference. The MARB also generates the arb and hold lines for the repeaters.

The MARB controls the ID Mask 3:0 signals for the repeater. There are three ports for these signals: the bus port, xmit port and recv port. The bus port is a bidirectional port that transmits and receives the ID MASK lines onto the bus. The xmit port transmits and receives the ID MASK over the cables to the second repeater. The recv port inputs the ID MASK lines from general purpose registers (GPRs) where they are ready to be placed on the bus. A storage location is used to hold the ID of a local CSR read transaction. This ID is muxed onto the xmit port and placed with CSR read return data.

The last function of the MARB MCA is to control parity for the bus control lines (function and ID/mask). The parity signals use the same bus, xmit and recv ports as the ID MASK signals. Control parity is generated for CSR read return data using a constant read return good function code and the proper ID of the requesting CPU. Parity is generated from the bus ID/Mask lines and the bus Function ID parity and output to the CCF MCA to check for parity errors on the bus.

The CCF MCA 54 has three primary functions: control of the repeater data paths, confirmation of the bus transactions and control of the bus FUNCTION lines. The control part of this MCA covers many functions, including bus control parity error checking, interlock flow control, loading the remote buffers, blocking the arb request line, and CSR data flow.

Bus confirmation is generated by the first repeater 10 for transactions that are generated by the devices on the first bus. The second repeater 12 must read bus confirmation (devices on the second bus) and act accordingly. For read return data, a confirmation is not required by the MCL 26 or I/O adapters (28, 30, 32) thus the second repeater 12 does not send one. The same holds true for read return data and cache invalidate traffic that is output onto the first bus 14 by the device 10 on the first bus. Thus there is no confirmation from the device on the first bus 14 to respond to.

The last function of the CCF MCA is to control the bus FUNCTION 4:0 signals for the repeater. There are three ports for these signals: the bus port, xmit port and recv port. The bus port is a bidirectional port that transmits and receives the FUNCTION lines onto the bus. The xmit port outputs the FUNCTION bits to the remote repeater. The recv port inputs the FUNCTION lines from the GPRs when they are ready to be placed on the bus.

The data address path (DAP) MCA 52 is a byte wide chip which is located near the finger pins on the first or second repeaters (10 or 12). Together with the CCF 54, BCON 55 and MARB 53, the four DAPs 52 provide the bus interface for the repeaters (10 or 12). The function of the DAP is to latch the bus ADDRESS DATA 31:0 lines with every A clock. The data lines are divided along byte boundaries and one byte of data is latched by each DAP. Upon receiving the bus ADDRESS DATA, each DAP 52 will generate byte parity for the byte it has latched. The four resulting byte parity bits will be checked with the bus data parity bit and resulting errors will be sent to the IFC MCA 51. The DAPs 52 will also check the bus ADDRESS DATA lines for the occurrence of repeater CSR (control status registers) addresses. Each DAP 52 will assert a bit if it detects 'correct byte' in a potential CSR address. If all the DAPs are asserting this bit, then the current transaction is a CSR transaction and appropriate action is taken by the module. The bus ADDRESS DATA 31:0 which was latched on an A clock will be output from the DAPs with the signal name XMIT ADDRESS DATA 31:0.

The DAP 523 also is used to accept data from the GPRs which reside on each repeater. The GPRs on the first repeater and second repeater form the read return buffer 60 and transaction buffer 50, respectively. The DAP latches RECV ADDR DATA 31:0 from the GPRs with every A clock. This data is output on the bus with the next B clock via the bidirectional bus ADDRESS DATA 31:0 lines if the arbitration logic asserts repeater BUS ENABLE.

Finally, the DAPs 52 are used to implement interprocessor interrupts in the multiprocessor system. A processor desiring to interrupt another must write to the interprocessor interrupt mask register. By writing the appropriate data during this operation, any processor can interrupt any or all of the other processors.

The Interrupt and Fault Controller MCA 51 is divided into the following three functional sections:
Interrupt Handler
Fault Controller
Diagnostic Mode Controller The interrupt handler portion of the IFC 51 is used to receive and generate the MEMORY INTERRUPT line to the CPUs. The IFC 51 on the second repeater 12 will receive MEMORY INTERRUPT from the MCL 26 on the second bus 16 and 'OR' it with its own internal interrupt signal. This logical 'OR' function generates the repeater MEMORY INTERRUPT signal which is passed over the cables to the repeater. The IFC 51 on the first repeater 10 locally 'ORs' this signal with its own internal interrupt signal and sends this out on the first bus 14 as MEMORY INTERRUPT. The IFC 51 contains a timeout circuit to determine when the repeater should stop retrying a command and assert its interrupt signal. Additionally, each repeater's IFC contains a bit to inform the CPU if it was responsible for asserting MEMORY INTERRUPT.

The Buffer Control MCA 55 is used to control the General Purpose Registers (GPRs) 70 located on each repeater (10 or 12). The GPRs 70 on the second repeater are used as a transaction buffer (TBUF) 50, that is, they buffer transactions waiting to go on the second bus or CSR transaction to the second repeater. The GPRs 70 on the first repeater are used as a read return buffer (RBUF) 60, that is, they buffer read return data from memory and I/O as well as memory BW CSR and processor BW CSR read return data. The RBUF also contains write commands from I/O to memory. These are passed to the first bus 14 to perform cache invalidates.

The BCON 55 maintains two pointers, one for the current data being outputted and one pointing to the next location to be loaded with data in the GPR's 70. Additionally, the BCON 55 has circuitry to generate BUFFER EMPTY and BUFFER FULL signals.

TRANSACTION SPECIFICS

Because there are two separate busses, there must be two separate bus controllers. The repeater modules 10 and 12 function as the bus controllers for each bus.

The arbitration among bus nodes is controlled by the repeater on both the first bus 14 and the second bus 16.

Present systems require that memory and I/O confirm all CPU commands while read return data from memory or I/O is not confirmed by the commanding node. The repeaters 10 and 12 serve as the interface between devices on the first bus (18, 20, 22, 24) and memory 34 and other devices 28, 30, 32 on the second bus 16. Thus the first repeater 10 has to confirm commands on the first bus 14 and the second repeater 12 must check the confirmation sent out by the MCL 26 or other devices on the second bus for each command sent out by the repeater. For read return data, the MCL 26 is not waiting for a confirmation thus none is given by the second repeater 12. Likewise, the devices on the first bus do not generate a confirmation for the read return data thus the first repeater 10 does not wait for one.

The memory controller 26 retains the Memory Busy signal which tells all nodes on the second bus that the MCl 26 is not accepting any more commands. The second repeater 12 must input this busy signal and follow the appropriate rule of transaction abortion. For the first bus 14, the first repeater 10 will have control of the Memory Busy signal. This line is asserted when the first repeater 10 will not accept any more transactions from the devices on the first bus (18, 20, 22, 24) because the second repeaters transaction buffers 50 are full.

The buffer on the second repeater 12 is referred to as the transaction buffer 50. This is because it stores read and write transactions. These transactions are received from the devices on the first bus 10. They are then sent to the second repeater where they are stored in the transaction buffer (TBUF) 50. When the TBUF 50 is not empty, the second repeater 12 will be arbing for the second bus 16. Upon winning the bus, the transaction in the front of the buffer will be placed on the second bus 16 where the appropriate node can accept it. If it is an internal repeater transaction, no ARB will happen and the second repeater 12 will execute the sequence of an internal read or write.

If an interlock read command is driven from the TBUF 50 onto the second bus 16 and the MCL 26 returns an interlock busy confirmation, special hardware on the repeater stores and retries the interlock command as shown in FIG. 2. The existence of this interlock buffer (IBUF) 56 allows the repeater to store away one outstanding interlock read transaction. This enables the repeater to drive following transactions which may reside in the TBUF 50 onto the second bus 16 while the IBUF 56 waits for the memory to become unlocked. Upon detecting an unlock write command on the second bus 16, the second repeater 12 selects the IBUF 56 as the source of the next transaction to be driven onto the bus. The interlock buffer 56 is a one location buffer which resides in the second repeater 12.

The buffer on the first repeater 10 is called the read return buffer (RBUF) 60. This buffer is used to temporarily store read return data and write commands for cache invalidation. The RBUF 60 accepts this data from the second repeater 12 and data from reads from devices on the first bus and buffers to internal repeater and buffers it awaiting access to the first bus 14 as long as the RBUF 60 is not empty. Upon winning the bus, the repeater drives the contents of the next location in the RBUF 60 onto the first bus 14.

The bus window interconnect 42 is the connection between the two repeaters. It consists of two uni-directional data paths with each path made up of the following signals:

| | |
|---|---|
| FUNCTION 4:0 | 5 |
| ID 3:0 | 4 |
| FUNCTION ID PARITY | 1 |
| ADDRESS DATA 31:0 | 32 |
| DATA PARITY | 1 |
| LOAD REMOTE | 1 |
| CSR ADDRESS | 1 |
| BW FAULT | 1 |
| BUFFER FULL | 1 |
| SLOW CLOCK | 1 |
| MEMORY INTERRUPT/UNJAM | 1 |
| SPARE 2:0 | |
| | 52 |

Each signal is driven differentially from an OR/NOR gate and received differentially by a triple line receiver on the other BW module. With two data paths and differentially driven signals, the total number of differential signals driven over the cables is 208 (52 signals × 2 for differential × 2 for two data paths).

CPU TO MEMORY TRANSACTION

Referring to FIGS. 2 and 4, the BW module 10 receives all transactions that are transmitted on the processor bus 14 by latching the following bus signals on an A clock:

| SIGNAL | # OF BITS | RECEIVING MCA |
|---|---|---|
| BUS FUNCTION 4:0 | 5 | CCF |
| BUS ID MASK 3:0 | 4 | MARB |
| BUS FUNCTION ID PARITY | 1 | MARB |
| BUS ADDRESS DATA 31:0 | 32 | DAPS |
| BUS DATA PARITY | 1 | BCON |

Each DAP MCA 52 generates byte parity for their respective bus ADDRESS DATA lines. These are compared with the bus DATA PARITY signal from the BCON 55 and any error reported to the IFC 51. The MARB 53 and CCF MCAs 54 check parity of the bus ID/MASK and FUNCTION bits with the bus FUNCTION ID PARITY and report any error to the IFC MCA 51 for handling.

The first repeater 10 will respond with a confirmation to all transactions that are destined for the second bus or either repeater. All transactions on this bus are latched, checked for parity, and decided if they should be passed to the other repeater 12. These transactions are confirmed on the bus with an ack, busy, interlock busy or no response. An illegal function or parity error causes no response, while an interlock busy response depends on the state of the interlock state bit 59. A remote busy signal from the signal repeater 12 generates MEM BUSY on the first bus 14.

Transactions are accepted by the first repeater 10 must be further checked to see if they will stay on this repeater (internal read or write) or if they will be transmitted to the second repeater module 12.

The transactions that are received on the second repeater 12 must be queued before they are placed on the second bus 16. The current transaction moves along as each bus enable places data on the second bus 16.

If the transaction is a local CSR transaction, the MARB 53 pulls CSR BUSY to freeze the bus. The CCF 54 asserts the signal SELECT CSR to enable the CSR data path after a 5 cycle delay (to make sure the bus is free). If it is not a CSR transaction, BUFFER ARB is asserted to gain access to the memory bus. The TBUF 50 pointers don't move until a BW BUS ENABLE occurs. The data moves onto the bus on the next B clock while the TBUF 50 places the next cycle into the data path MCAs. The MARB 53 generates a HOLD signal for the data cycles that accompany a write transaction in order to keep the memory bus. If a new transaction comes into the data path 52 MCAs, the MARB 53 generates an ARB line in order to start a new transaction. This transaction must wait until the last transaction has completed on the bus and then start this process over.

The memory 26 and devices on the second bus (28, 30, 32) must confirm all transactions that originate from the second repeater 12. Also, the MCL 26 asserts MEMORY BUSY if it will confirm with a busy response. The second repeater uses the MEMORY BUSY signal to abort memory transactions and the actual confirmation code to confirm I/O transactions. This enables memory transactions to be placed on the bus before the confirmation of the last transaction has been processed, thus speeding up the throughput. If MEMORY BUSY is not asserted during the command cycle or the first data cycle of a write transaction, the second repeater assumes an ACK confirmation and continues. If the confirmation is a NOACK, the second repeater asserts an interrupt and sets a timeout code. If the confirmation is interlock busy, the IBUF 56-58 has the interlock command and retries when memory becomes unlocked. A busy confirmation cannot happen since MEMORY BUSY was not asserted. If MEMORY BUSY is asserted during the command or the first data cycle, the second repeater will discontinue the command (if it is a write transaction) and retry. The second repeater will asserts its arb line to try to regain the bus when MEMORY BUSY goes away and place the interrupted transaction back on the bus.

The confirmation codes for I/O commands are ack, busy, interlock busy, or no response. Busy or no response causes the BCON 55 to use the last transaction that caused the busy/noack response. This data is output from the GPRs 70 on the next clock so that the busy/noack transaction can be retried. A timeout counter is kept in the IFC 51 to stop the transaction from retrying indefinitely. An ack response causes the BCON 55 to output the next transaction in the TBUF 50 (thus flushing the last transaction). An interlock busy confirmation is not valid from the I/O controllers.

MEMORY TO CPU TRANSACTION

Referring to FIGS. 3 and 4, said second bus transactions differ from said first bus transactions in one important way. On the first bus 24 the repeater 10 accepts every valid transaction placed on the bus and sends it to the other repeater 12. This is due to the nature of the transactions placed on the first bus 14; they are operations to memory and I/O. The same is not true on the second bus. This bus 16 passes transactions between devices 28, 30, 32 and memory 26 as well as from devices on said first bus to devices on said second bus or to memory. Passing all second bus transactions to the first bus would cause unnecessarily excessive traffic on the first bus. For this reason care must be taken by the second repeater 12 to insure that a second bus transaction is critical to the correct operation of the devices on the first bus before passing the transaction to the first repeater 10.

The bus interface on the second repeater 12 monitors the bus every cycle as every bus node will do.

Each cycle, when the bus data is latched, the repeater will check for data/address and function/ID parity errors. This parity checking will occur whether the current bus transaction is intended for the repeater or not.

Also with each cycle, the control/confirmation/function logic will decode the function and ID bits looking for very specific combinations of these bits. If an appropriate function and ID are found, the transaction will be prepared to be transferred to the other module. If not, the current transaction will be ignored by the second repeater. The functions which will be passed to the other repeater are:

Read Return and Read Continuation function codes accompanied by the ID code of any device residing on the first bus.

Write commands from a device located on the second bus to memory. (Note that only the command cycle of such commands will be transmitted to the first repeater, data cycles will be ignored. This is because these commands are only passed in order to invalidate the caches on the first bus.)

The second repeater 12 will accept only read return and read continuation codes destined for the devices resident on the first bus since read rtn/cont destined for devices on the second bus 16 would cause needless traffic on the first bus 14.

The write commands will be sent to the first repeater 10 in order to perform write invalidate operations on the caches. Since the caches will not require any data to be passed with the write command, none will be transmitted in the cycles following the command. In addition to passing all write commands, the second repeater will detect unlock writes. It is important that upon detecting an unlock write the repeater arb for the bus on the next cycle and upon winning the bus it must drive its latent interlock read transaction (if any). This prevents interlock starvation from occurring on the first bus 14.

No confirmation will be sent by the second repeater 12 to the second bus 16 under any condition. This is due to the fact that bus nodes do not expect confirmation of read return and read continuation transactions and the write operations that are being accepted are not really intended for the repeater. These write transactions will be acknowledged by the I/O or memory nodes for which they are intended.

The bus signals latched into the bus interface logic on every A clock will be present at the second repeater's drivers 71 following the next A clock. Once the CCF logic has detected one of the above functions, it will assert the XMIT LOAD REMOTE BUFFER line. This signal informs the first repeater 10 that the current data being passed is valid and should be latched into the first repeater's buffers. It also causes the BCON 55 to increment its write pointer after the data is latched.

Upon receiving a transaction and the accompanying RECV LOAD REMOVE BUF signal (this is the name of XMIT LOAD REMOTE BUF at the first repeater receivers 72) from the second repeater 12 the first repeater 10 will latch the function/ID/mask, parity bits and data/address into its GPRs 70 with the next B clock. The GPRs 70 operate as a FIFO and when the command comes to the front of the buffer, the MARB 53 logic on the processor first repeater 10 requests the processor bus 14 via the BUFFER ARB line to the master arbitration logic. During the time while it is waiting for the bus the GPRs 70 have the current transaction on their output pins and the processor bus interface chips are latching this data into their RECV DATA/ADDR/FUNC/ID/PARITY . . . ports with every A clock.

Upon receiving a BW BUS ENABLE signal from the MARB 53, the first bus interface drives the transaction onto the first bus 14. With the assertion of BW BUS ENABLE the BCON 55 moves its pointers to the next location in the GPRs 70. The GPRs 70 place the data from this new location on their output pins during the next B cycle and the bus interface chips latch this new data on the next A cycle. If BW BUS ENABLE remains asserted this process of moving the pointers and driving new data on the bus will continue. BW BUS ENABLE will continue to be asserted for multiple cycles in the case of a read return data function followed by read continuation data functions. In the case where the GPRs 70 contain multiple distinct commands, the RBUF 60 will get flushed due to the fact that the first repeater 10 has memory priority. That is, the first repeater 10 will be granted BUS ENABLE every time it asserts its ARB line as long as no other node is asserting bus HOLD. The MARB 53 logic will insert a dead cycle between distinct commands.

After the command is placed on the first bus 14, the repeater never has to wait for confirmation. The CPUs never send any confirmation for read return and read continuation data.

Also, the write invalid commands are not destined for any node resident on this bus, so they also will not receive any confirmation.

INTERLOCK SCHEME

Interlock reads and unlock writes are special transactions that must be dealt with using specific hardware on the repeater. The problems occur when the first repeater 10 accepts an interlock read to memory and the second repeater 12 gets an interlock busy confirmation back from memory 26 that is currently locked by another interlock read transaction. The repeater 12 must store this interlock read transaction until memory becomes unlocked and then retry the interlock read.

Figure 6:
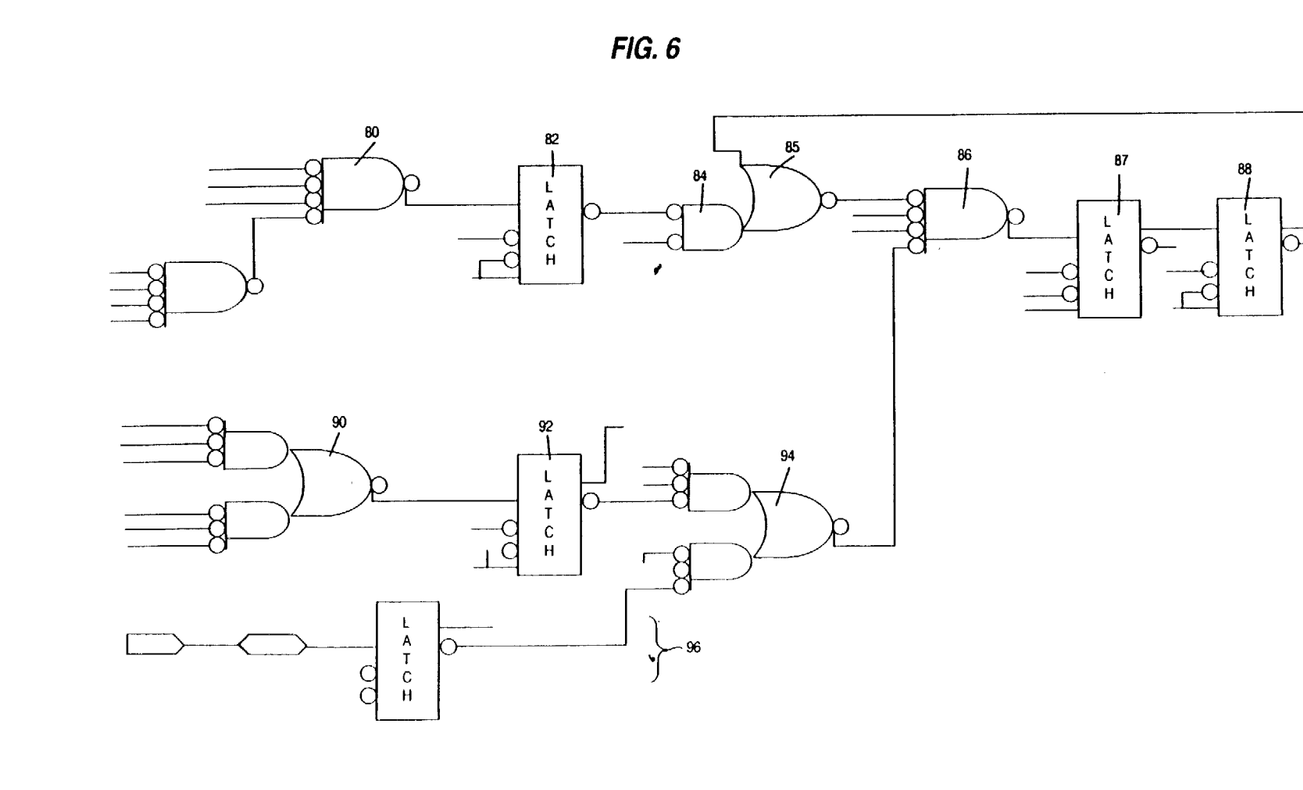
FIG. 6 is the control logic for the interlock state bit.
Figure 8:
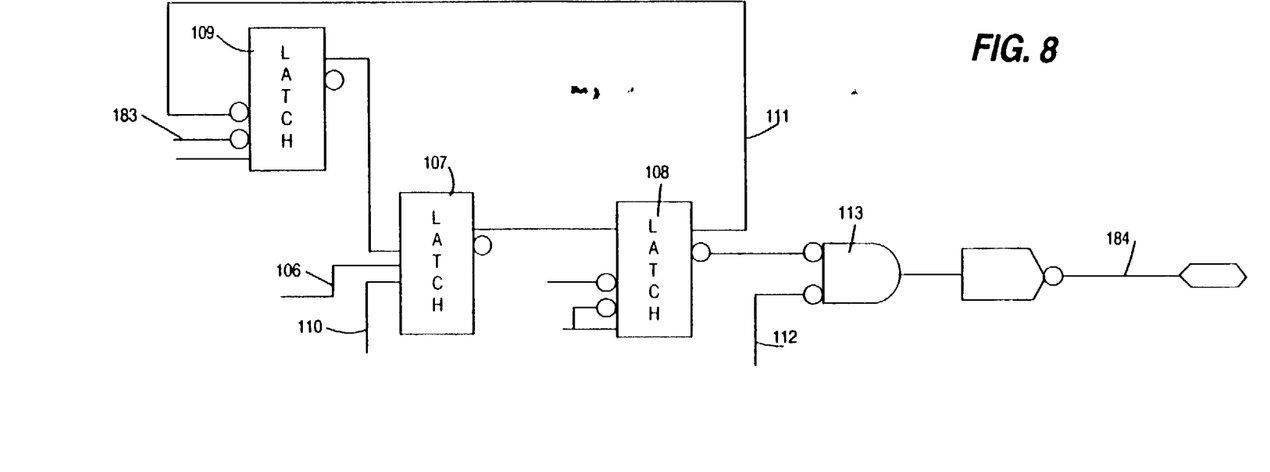
FIG. 8 is the control logic for storing an interlock transaction.
Figure 9:
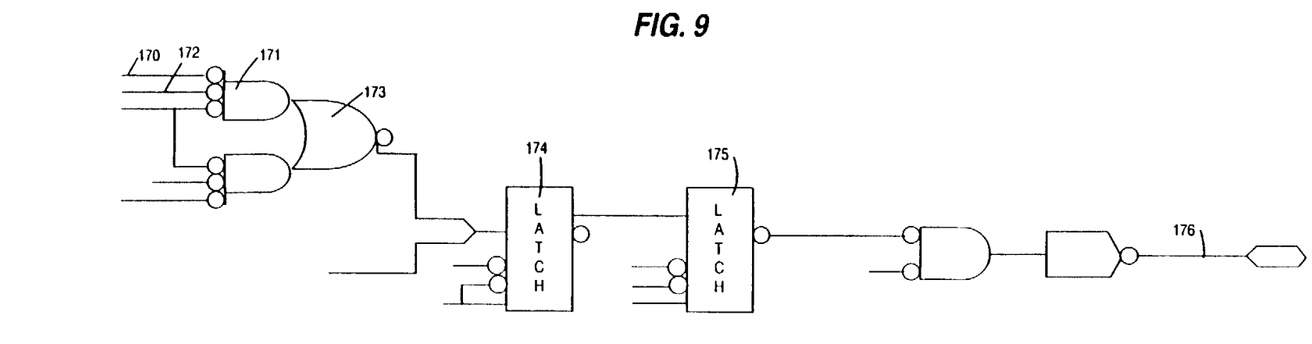
FIGS. 9 and 9a-9d are the bus confirmation logic.

The hardware needed to keep the interlocks in order and not congest the flow of transactions between repeaters consists of an interlock state bit 59 and interlock/unlock decode logic as shown in FIGS. 2, 6 and 9. Both are located on the first repeater 10. There is also a special interlock buffer (IBUF) 56 to hold one interlock transaction and decode logic to detect unlock writes on the second bus as shown in FIGS. 2, 7, 8, 9a-c and 10.

In order to keep interlock transactions from being lost, an interlock state bit 59 has been implemented in the first repeater 10. This bit determines whether or not an interlock transaction will be accepted by the first repeater 10 and passed to the second repeater's transaction buffer 50. The bit is set when an interlock transaction is accepted and reset when an unlock write is accepted by the first repeater 10. When the bit is set, another interlock transaction will not be accepted by the first repeater 10. The device that generated the interlock will receive an interlock busy confirmation. The device then waits for an unlock write on the first bus 14 before retrying the interlock transaction.

Referring to FIG. 6, there is shown a control logic circuit implementing the interlock state bit 59 in the first repeater 10. In operation, the Nand gate 80 detects an interlock read transaction from the first bus 14. The interlock condition is latched 82 and fed to an And gate 84. The interlock condition is checked by the And gate 84 to insure that no parity errors occurred. Next the interlocked condition (state bit asserted) is fed into a loop consisting of a Nor gate 85 or Nand gate 87 and latches 87 and 88. The loop maintains the state bit asserted, indicating a locked condition, until a clear lock signal is received by Nand gate 86.

An unlock write signal is detected by a Nor gate 90, latched 92, and checked for parity errors or timeout conditions before being fed to Nor gate 94. The output of Nor gate 94 is the clear lock signal that is fed to Nand gate 86 thus deasserting the interlock state bit.

A special clear interlock bit which takes path 96 can force a clear lock signal from Nor gate 94 to deassert the state bit.

The second repeater module 12 incorporates a one deep interlock buffer 56 for interlock read transactions. The IBUF 56 consists of a set of latches and is controlled by logic. The interlock transaction will be held in the buffer when an interlock busy confirmation is returned from the MCL 26. This IBUF 56 is loaded each time an interlock transaction is placed on the second bus 16 from the transaction buffer 50. The IBUF 56 is not used if a confirmation of ACK, BUSY, or NOACK is received. Busy or noack confirmations are handled by the transaction buffer control and immediately retried. The IBUF 56 is "pending" if a confirmation of interlock busy is received. The control logic then waits for an unlock write on the memory bus before retrying the "pending" interlock transaction. Confirmation is checked again and the transaction is retried, from the IBUF 56, if busy or noack is received. Another interlock busy confirmation will cause the IBUF logic to wait for another unlock write on the second bus. An ACK confirmation will clear all IBUF status. A timeout counter is implemented to stop infinite retires.

While the interlock transaction is waiting in the IBUF 56, other CPU transactions are being placed on the second bus 16 from the transaction buffer 50. A higher utilization of the buffers and both busses is realized.

READ INTERLOCK TRANSACTION FLOW

An interlock transaction is accepted by the first repeater 12 only when the interlock state bit 59 is not asserted. When the transaction is accepted, the interlock state bit 59 is then asserted which blocks all other interlock transactions by sending out an interlock busy confirmation to the corresponding transaction.

The first interlock transaction is transferred to the TBUF 50 in the second repeater 12 and waits for its turn on the second bus 16.

Figure 7:
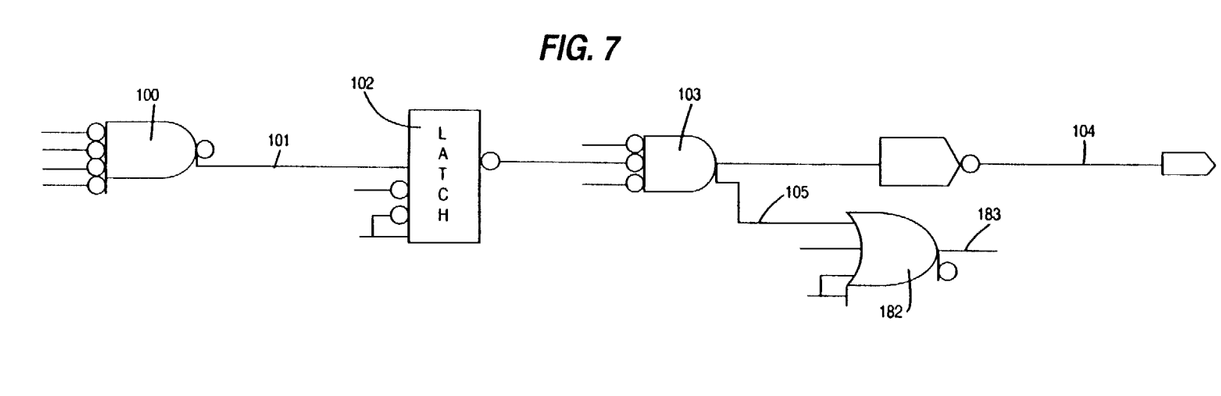
FIGS. 7, 7a, and 7b are the control logic for the interlock buffer.

Referring to FIG. 7 there is shown the control logic on the second repeater module 12 side for interlock transaction data output from the TUBF 50 to the CCF MCA 54. Nand gate 100 serves to determine if the CCF 54 has received an interlock command. A received interlock command 101 is then latched 102 and fed to And gate 103. When the memory bus enables the data at And gate 103, a bit is set 104 to allow the interlock command data to be stored in the interlock buffer 56.

Simultaneously, there is an internal storage of the data along path 105 as shown in FIG. 8. When both the store interlock signal and the A clock are true, the function data on line 106 fed out of the TBUF 50 is caught and latched at 108. An interlock mux select line 110 functions to put the interlock data back onto the second bus by selecting path 111 instead of path 106. When the second bus is enabled on line 112 the IBUF data is output through And gate 113 to the second bus 16.

In normal operation, the interlock buffers are over written each time an interlock transaction is output to the second bus 16. There is no possibility of losing an interlock transaction because the first repeater 10 returns interlock busy confirmation when a second interlock command is issued by another device on the first bus (18, 20, 22, 24). An unlock write on the first bus will deassert the interlock state bit 59 allowing more interlock read commands. Thus, there will be no other interlock reads in the TBUF 50 while the first interlock read is held in the IBUF 56.

Once the transaction is placed on the second bus 16, a corresponding interlock busy confirmation (no ack or busy would cause the second repeater to retry the same transaction) starts an interlock pending bit that waits for an unlock write on the second bus. When an unlock write transaction occurs, any transaction waiting in the TBUF 50 must continue to wait until the interlock transaction has been confirmed.

The IBUF 56 continues to retry the transaction if a confirmation of busy or noack is received. Interlock busy confirmation deasserts SEND INTERLOCK but causes the interlock pending bit to stay asserted to watch for another unlock write. An ack confirmation for the interlock deasserts the SEND INTERLOCK signal and the interlock pending bit to complete the interlock transaction.

The read return data from the interlock read transaction is sent back to the requesting device which generates an unlock write transaction. This unlock write is accepted by the first repeater 10 which causes a deassertion of the interlock state bit 59. Another interlock read can then be sent through to memory.

Figure 9A:
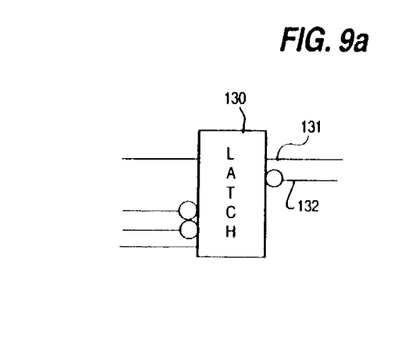
Figure 9B:
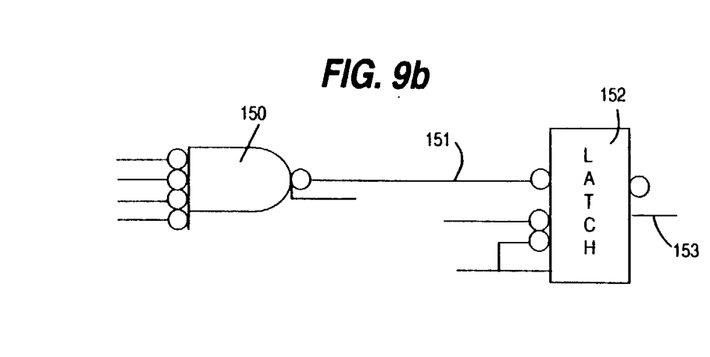
Figure 9C:
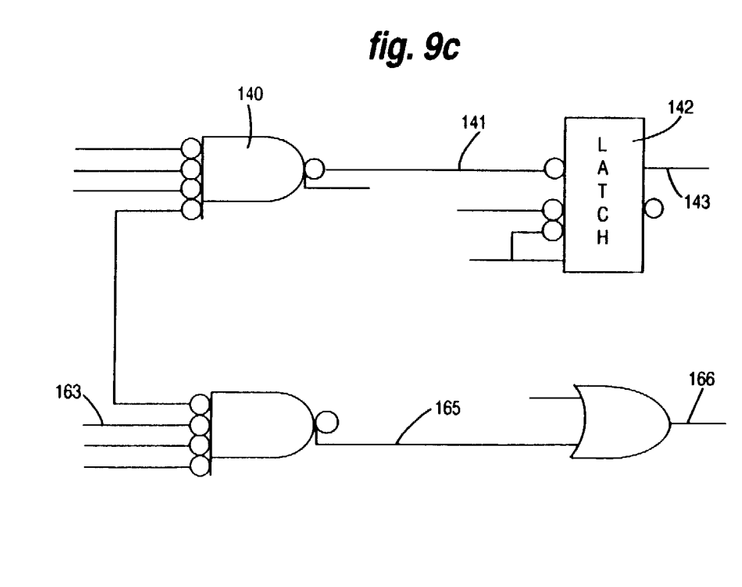

Referring to FIGS. 9-9c, there is shown the confirmation logic used on the first and second busses. FIG. 9a shows the bus confirmation bits which are latched off of the second bus from the MCL and devices. Latch 130 obtains the confirmation bits on lines 131 and 132 and sends them to the circuits shown in FIGS. 9b and 9c where they are checked.

Figure 9D:
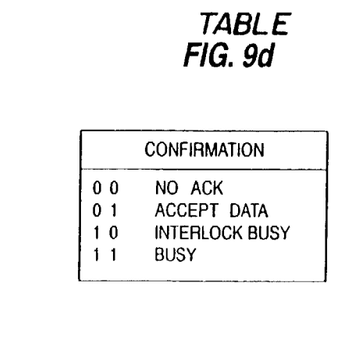
Figure 10:
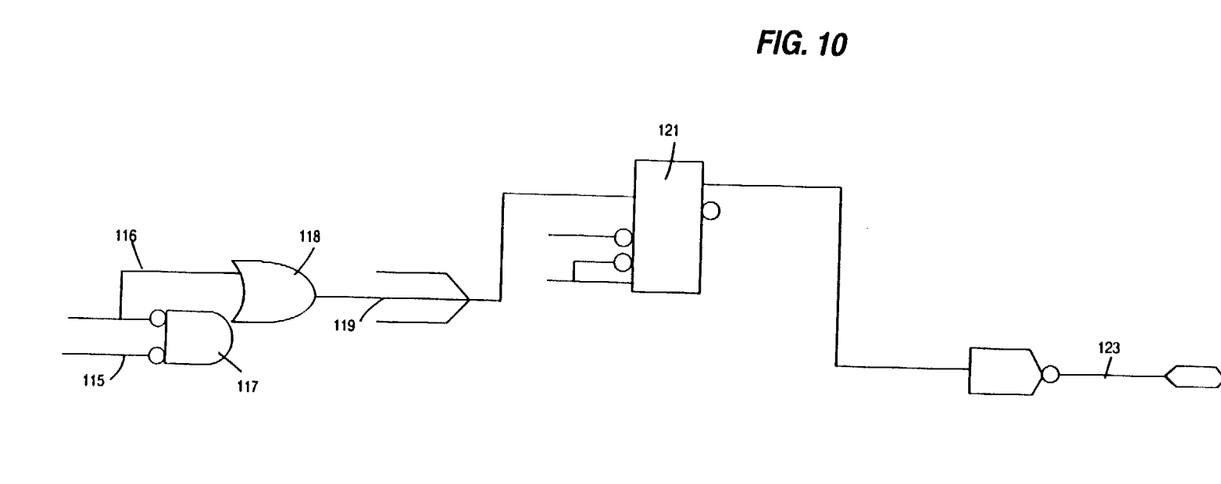
FIG. 10 is the control logic to change unlock write commands.

FIG. 9c Nands the confirmation bits in gate 140. Confirmations are obtained according to the table of FIG. 9d. If an interlock busy is obtained on line 141 and latched 142, a start interlock pending signal 143 is sent. A start interlock pending signal 143 is sent to the circuit in FIG. 7a which begins an interlock pending state 144.

Confirmation bit sent to FIG. 9c are Nand-ed in gate 150. If a buffer ack signal is obtained on lien 151 and latched 152, then a stop interlock pending signal on line 153 is sent.

Figure 7A:
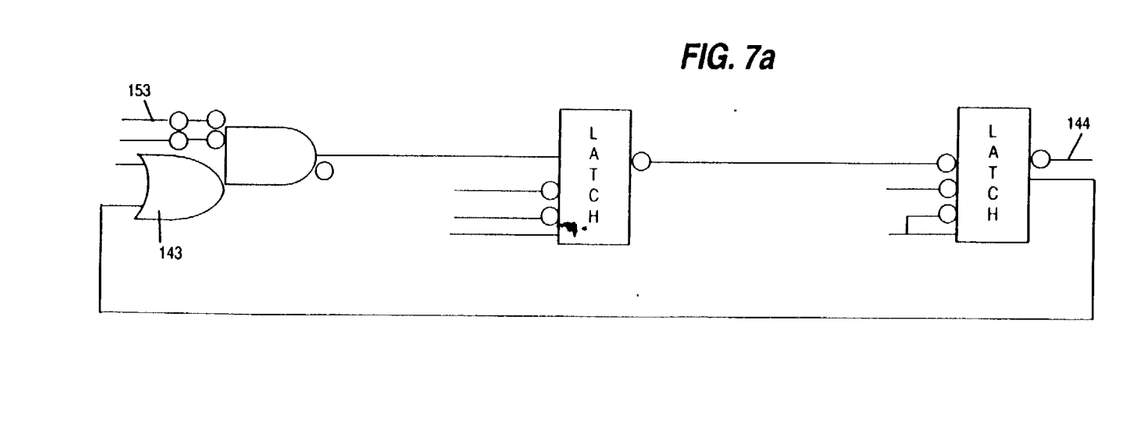

The stop interlock pending signal 153 is sent to FIG. 7a where it prevents the interlock pending signal on line 144 from being sent.

Figure 7B:
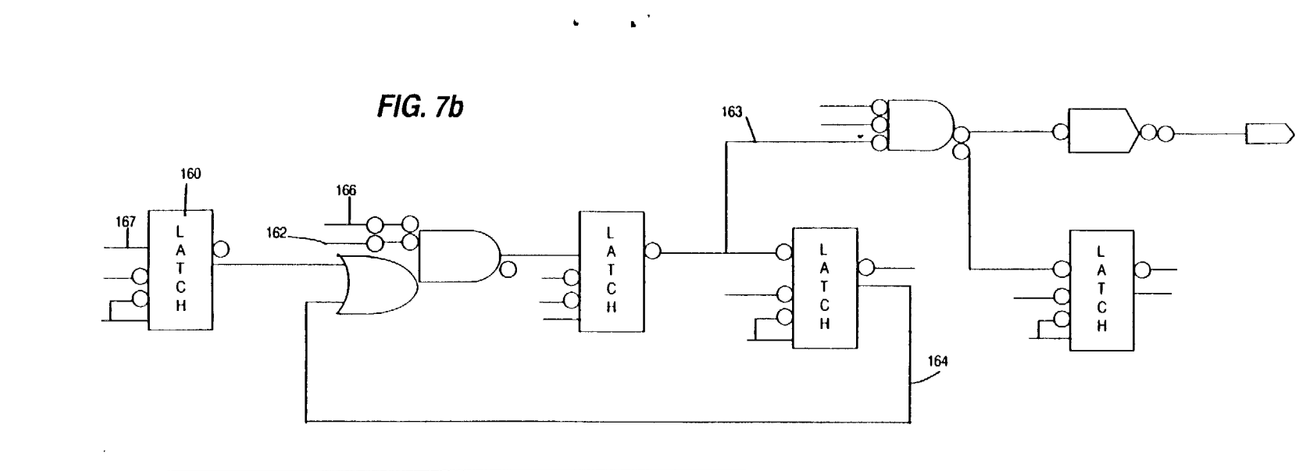

FIG. 7b is the control logic for when an interlock is pending waiting for an unlock write signal. An unlock write signal latched at 160 is fed to Nand gate 161. If an interlock pending signal is present on line 162 then a send interlock signal is generated on line 163 to release the data in the IBUF. Loop 164 functions to allow the send interlock 163 to continue to arb for the bus if it is busy.

Referring to FIG. 9c, if a send interlock signal on line 163 is Nand-ed with the confirmation bits and an interlock busy signal is obtained on line 165, then a stop send interlock signal is generated on line 166 so that the IBUF will not continue to send interlock data but will wait for another unlock write. FIG. 7b shows the stop send interlock signal on line 166 which will prevent the send interlock signal 163 from being sent until another unlock write is detected on line 167.

Referring to FIG. 9 there is shown the confirmation logic on the processor bus. When the state bit 59 is locked from the circuit in FIG. 6, the signal is sent to the And gate 171 on line 170. If there are no parity errors, timeouts, or unlock writes and an interlock transaction has occurred on line 172 then an interlock busy signal from Nor gate 173 is generated. The interlock busy signal is latched 174 and 175 and sent as the confirmation on line 176.

Devices on the first bus that have received an interlock busy confirmation, wait for an unlock write on the first bus 14 before retrying the interlock read transaction. An unlock write command from another device will reset the interlock state bit 59 in the first repeater module 10 and cause all other devices on the first bus to place their pending interlock transactions on the bus. An unlock write command from a device on the second bus controller would be placed on the first bus 14 to invalidate cache. This is how a preferred embodiment of the present invention invalidates the cache. However, in a contemplated embodiment, it would not reset the first repeater interlock state bit 59 (it is not accepted by the first repeater) but it would cause all devices on the first bus to retry their pending interlock transactions. This would cause additional bus traffic as the first repeater's interlock state bit 59 is still set and each interlock transaction would receive an interlock busy confirmation. For this reason, all unlock write commands from devices on the second bus are changed to write command (non-unlock) before they are placed on the first bus to invalidate each processor's cache.

TIMEOUT GENERATOR

A multiprocessor system implements a retry mechanism in case of a busy, interlocked or no ack confirmation code. The BCON 55 is designed to keep retrying the current command until it gets an acknowledge confirmation on the bus CONFIRMATION 1:0 lines. In order to cause the BCON 55 to flush the current transaction and move on to the next, a timeout circuit is located in the IFC MCA 51. The timeout clock is implemented with a two bit counter which uses the bus SLOW CLOCK signal as it is clock. The counter started with the assertion to BUFFER ARB by the CCF 54. The assertion of this signal indicates that the BCON 55 has a new command in its buffer which it would like to place on the bus. Once a BW BUS ENABLE signal is detected by the IFC 51, the possibility of a 'No access to bus' timeout condition is ruled out. Counting continues pending the receipt of the BUS CONFIRMATION 1:0 lines two cycles later. If the transaction was acknowledge, the counter is reset and waits for another BUFFER ARB signal to begin again. If the confirmation is one of busy or no response, the confirmation type is stored and counting continues pending retry. (If an interlocked busy confirmation is returned the transaction is placed in an interlock buffer and retried following the next occurrence of an unlock write. The next transaction resident in the BW module GPRs 70 driven by the BCON logic and the timeout counter is reset. If the timeout counter detects a timed out function, (this takes 750 to 1250 usec) it asserts FUNCTION TIMEOUT. This signal causes the BCON to move on the next transaction in the GPRs 70 and begin trying to send it to the bus. It also causes Memory Interrupt to be asserted if interrupts are enabled and the timeout code to be frozen in BW CSRO. Finally, FUNCTION.TIMEOUT causes the bus error address register (BW CSR 6) to be loaded with the address that was present in the DAPs 52 when the transaction timed out.

What is claimed is:

1. A method for providing an interlocking scheme for transferring interlock transactions between a first device coupled to a first bus and a second device coupled to a second bus, comprising the steps of:
   (a) setting a state circuit located in a first repeater when an interlock transaction is accepted from the first device through the first bus;
   (b) generating an interlock busy signal whenever said interlock transaction is generated from the first device on said first bus while said state circuit is set;
   (c) not accepting said interlock transaction into the first repeater when said interlock busy signal is generated;
   (d) resetting said state circuit when an unlock write signal is accepted by said first repeater;
   (e) passing an accepted interlock transaction to a transaction buffer in a second repeater;
   (f) loading an accepted interlock transaction from said transaction buffer into an interlock buffer in said second repeater;
   (g) attempting to simultaneously load an accepted interlock transaction from said transaction buffer onto a second bus;
   (h) keeping said interlock buffer pending if said transaction buffer receives an interlock busy signal from said second bus; and
   (i) retrying a pending interlock buffer transaction after an unlock write signal is received on said second bus.

2. A method according to claim 1 wherein said step of loading said one accepted interlock transaction into the interlock buffer is carried out by using a one-deep interlock buffer.

3. A method according to claim 1 further comprising the step of retrying a transaction buffer interlock transaction if said transaction buffer receives a busy signal through said second bus.

4. A method according to claim 1 further comprising the step of retrying a transaction buffer interlock transaction if said transaction buffer receives a noack signal through said second bus.

5. A method according to claim 1 further comprising the step of indicating a clear status for the interlock buffer if an ack signal is received by said interlock buffer.

6. A method according to claim 1, further comprising the steps of:
   (a) changing an unlock write signal generated by an I/O device on said second bus to a write signal in the second repeater; and
   (b) passing said write signal through said first repeater to invalidate data in a cache memory in said first device.

* * * * *